(12) United States Patent
Wood et al.

(10) Patent No.: US 8,875,800 B2
(45) Date of Patent: Nov. 4, 2014

(54) DOWNHOLE SEALING SYSTEM USING CEMENT ACTIVATED MATERIAL AND METHOD OF DOWNHOLE SEALING

(75) Inventors: Edward T. Wood, Kingwood, TX (US); Justin Cash Bowersock, Spring, TX (US); James R. Korte, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 298 days.

(21) Appl. No.: 13/224,496

(22) Filed: Sep. 2, 2011

(65) Prior Publication Data

US 2013/0056207 A1 Mar. 7, 2013

(51) Int. Cl.
*E21B 33/13* (2006.01)
*E21B 33/12* (2006.01)
*C04B 40/06* (2006.01)
*C09K 8/467* (2006.01)
*C04B 28/02* (2006.01)

(52) U.S. Cl.
CPC ............. *E21B 33/13* (2013.01); *E21B 33/1216* (2013.01); *C04B 40/0633* (2013.01); *C09K 8/467* (2013.01); *C04B 28/02* (2013.01)
USPC ........... 166/387; 166/135; 166/192; 166/293; 166/386

(58) Field of Classification Search
None
See application file for complete search history.

(56) References Cited

U.S. PATENT DOCUMENTS

| | | | |
|---|---|---|---|
| 4,446,920 A * | 5/1984 | Woytek et al. | 166/297 |
| 5,658,380 A * | 8/1997 | Dillenbeck, III | 106/823 |
| 6,082,450 A | 7/2000 | Snider et al. | |
| 6,651,564 B1 * | 11/2003 | Tite et al. | 102/312 |
| 6,907,937 B2 | 6/2005 | Whanger et al. | |
| 7,472,757 B2 | 1/2009 | Freyer | |
| 7,665,538 B2 | 2/2010 | Robisson et al. | |
| 7,681,653 B2 | 3/2010 | Korte et al. | |
| 7,690,437 B2 | 4/2010 | Guillot et al. | |
| 7,784,532 B2 | 8/2010 | Sevre et al. | |
| 7,832,491 B2 | 11/2010 | Freyer | |
| 7,841,417 B2 | 11/2010 | Allison et al. | |
| 7,938,186 B1 | 5/2011 | Badalamenti et al. | |
| 7,938,191 B2 | 5/2011 | Vaidya | |
| 2008/0110628 A1 | 5/2008 | Bosma et al. | |
| 2009/0200028 A1 | 8/2009 | Dewar | |
| 2009/0205817 A1 | 8/2009 | Gustafson et al. | |
| 2009/0205841 A1 | 8/2009 | Kluge et al. | |
| 2009/0211770 A1 | 8/2009 | Nutley et al. | |

(Continued)

FOREIGN PATENT DOCUMENTS

| | | | |
|---|---|---|---|
| EP | 2119866 A1 * | 11/2009 | |
| WO | WO2009098467 A1 | 8/2009 | |
| WO | WO2010096417 | 8/2010 | |

OTHER PUBLICATIONS

Al Yami et al. "Investigation of Water-Swelling Packers." CIPC/SPE Gas Technology Symposium 2008 Joint Conference, Jun. 16-19, 2008, Calgary, Alberta, Canada.

(Continued)

*Primary Examiner* — Zakiya W Bates

(74) *Attorney, Agent, or Firm* — Cantor Colburn LLP

(57) ABSTRACT

A downhole sealing system includes a reactive material provided on a tubular and including an oxidizable substance; and a sealing material, wherein the oxidizable substance oxidizes when in contact with the sealing material. Also included is a method of providing a seal in a downhole system.

20 Claims, 3 Drawing Sheets

(56) References Cited

U.S. PATENT DOCUMENTS

| | | |
|---|---|---|
| 2009/0301635 A1* | 12/2009 | Corre et al. ............. 156/84 |
| 2010/0051294 A1 | 3/2010 | Nutley et al. |
| 2010/0071912 A1 | 3/2010 | Mackenzie |
| 2010/0163252 A1 | 7/2010 | De La Mothe et al. |
| 2010/0288514 A1 | 11/2010 | Freyer |
| 2010/0300689 A1 | 12/2010 | McRobb et al. |
| 2010/0314134 A1 | 12/2010 | Nutley et al. |

OTHER PUBLICATIONS

Dickenson et al. "Combined Technologies Offer Time-Saving and Efficient Alternatives for Zonal Isolation." SPE/IADC Middle East Drilling Technology Conference & Exhibition, Oct. 26-28, 2009, Manama, Bahrain.

International Search Report and Written Opinon, Date of Mailing Jan. 31, 2013, International Application No. PCT/US2012/053335, Korean Intellectual Property Office, Written opinion 6 pages; International Search Report 3 pages.

* cited by examiner

DOWNHOLE SEALING SYSTEM USING CEMENT ACTIVATED MATERIAL AND METHOD OF DOWNHOLE SEALING

BACKGROUND

In the drilling and completion industry, the formation of boreholes for the purpose of production or injection of fluids is commons. The boreholes are used for exploration or extraction of natural resources such as hydrocarbons, oil, gas, water, and CO2 sequestration. In the construction of the borehole, it is normally necessary to fill and/or seal at least certain critical sections between casings or casing and open hole with cement. In order for cement to seal at critical points, there must be a completely effective mud displacement by the cement. If the annular space is not filled with cement or if the cement loses bulk volume during the hydration process, then the uncemented sections may form a leak path for gas or oil. In addition to poor displacement and cement bulk volume losses, the cement sheath may be damaged by thermal effects or pressure fluctuations.

An existing technique for sealing the unwanted flow paths formed within the cement sheath includes the use of a reactive or swelling material that reacts with either oil or water to swell and seal the flow paths. However, a limitation of this method is a lack of control of the activation or swell rate of these elements in contact with oil, water, or cement. Other methods such as swellable elastomers on openhole expandable systems completely avoid the use of cement to eliminate the problems of channeling, however they also do not benefit from the advantageous properties of cement, such as low cost, ease of use, and predictable hardening properties.

BRIEF DESCRIPTION

A downhole sealing system includes a reactive material provided on a tubular and including an oxidizable substance; and a sealing material, wherein the oxidizable substance oxidizes when in contact with the sealing material.

A method of providing a seal in a downhole system, the method including placing a tubular with a reactive material thereon in a borehole, the reactive material including an oxidizable material that reacts at a first rate to water; and passing a sealing material down the tubular, wherein the oxidizable material reacts at a second rate, faster than the first rate, to the sealing material.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
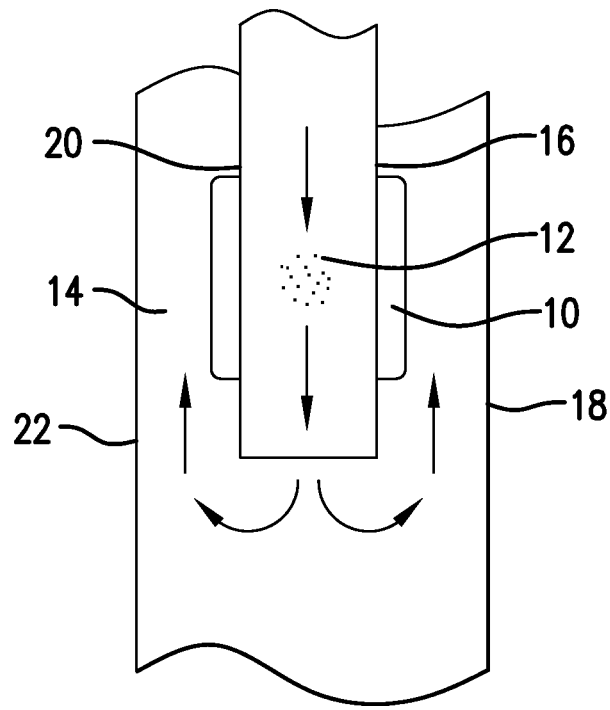
FIG. 1 depicts a cross sectional view of an exemplary embodiment of a downhole tubular carrying a reactive material thereon.

With reference to FIG. 1, in order to overcome the limitations of prior sealing methods using cement sheaths, a reactive material 10 is employed that includes an oxidizable material that reacts very slowly with water or oil but reacts rapidly when exposed to the chemical properties of a base such as cement 12. One specific property of cement 12 is a very high PH relative to other fluids commonly encountered in the industry. When the reactive material 10 is contacted by cement 12, a reaction is triggered allowing an annulus 14, or other area to be sealed, to seal while the cement 12 is essentially liquid, and continues a swelling process until it absorbs and fills the voids in the cement 12. If the cement 12 is subsequently damaged by thermal effects or pressure fluctuations, embodiments of the reactive material 10 may further include swellable materials that will then react with water or oil to continue sealing the leak paths.

In one exemplary embodiment, the reactive material 10 is a composition including an oxidizable material utilized as a prop for the cement 12. The unoxidized state of the oxidizable material is of smaller dimensions than the oxidized state, such that the oxidizable material can be used as a mechanical force generator. The oxidizable material may be a powdered metal such as Aluminum, but other oxidizable materials and metals may also be utilized.

Aluminum, for example, is very stable at a pH range from 4-8 but reactive outside of the range. Thus, Aluminum is a good candidate for a powder material for a cementing application since Aluminum is stable in water or oil, yet extremely reactive when it comes into contact with cement, which has a high pH value, upwards to about 13 and even about 14. In one exemplary embodiment, the rate of reaction for different applications can be tailored, such as by applying an engineered catalyst coating or corrosion resistant coating on the Al powder to accelerate or decelerate the reaction as application warrants, while making the powder mechanically strong.

Figure 2:
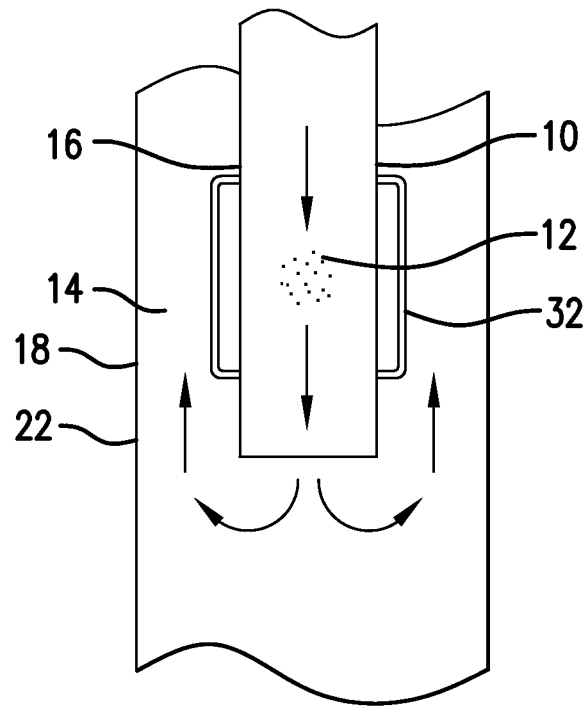
FIG. 2 depicts a cross sectional view of another exemplary embodiment of a downhole tubular carrying a reactive material thereon.

In one exemplary embodiment of a cementing application, as shown in FIG. 1, the reactive material 10 including the oxidizable material is placed on a tubular 16, such as a liner or casing. The reactive material 10 may be coated on an exterior surface 20 of the tubular 16 or may be separately formed in a tubular fashion to be placed over the tubular 16 such as by sliding or clamping. The oxidizable material in the reactive material 10 does not react and oxidize, or reacts and oxidizes very slowly, in the presence of water and/or oil, and therefore the tubular 16 can be placed in an open hole 18 or within another casing in a borehole, without substantially changing or altering in the presence of commonly encountered downhole fluids. Certain non-reactive materials, such as an inert polymeric material, may be combined the oxidizable material in the reactive material 10, such as for providing a reactive material 10 having spreadable properties, strength, flexibility, etc. As shown in FIG. 2, a degradable protective coating 20 can be placed on the reactive material 10 such that the oxidizable material within the reactive material 10 does not become damaged or prematurely oxidized during placement of the tubular 16 within the borehole 18 or other tubular. The degradable protective coating 20 may degrade in the presence of oil and/or water such that the reactive material 10 is exposed.

When the tubular 16 is ready for cementing within an open hole 18 or within another tubular 16, the cement 12 may be introduced in a known fashion in a downhole direction as indicated by the arrows within the tubular 16, such as by pumping the cement 12 down the tubular 16 and then back up through the free annular space 14 between the tubular 16 and the formation wall 22 or between the tubular 16 and an outer tubular, where the cement 12 then bonds the tubular 16 to the formation wall 22 or other casing to prevent fluids, such as oil and water, from moving from one zone to another. The cement 12 is introduced in a liquid format and does not set until at least a time after it is located in place for packing. Displacement fluid may be used to push the cement 12 out of the tubular 16.

Figure 3:
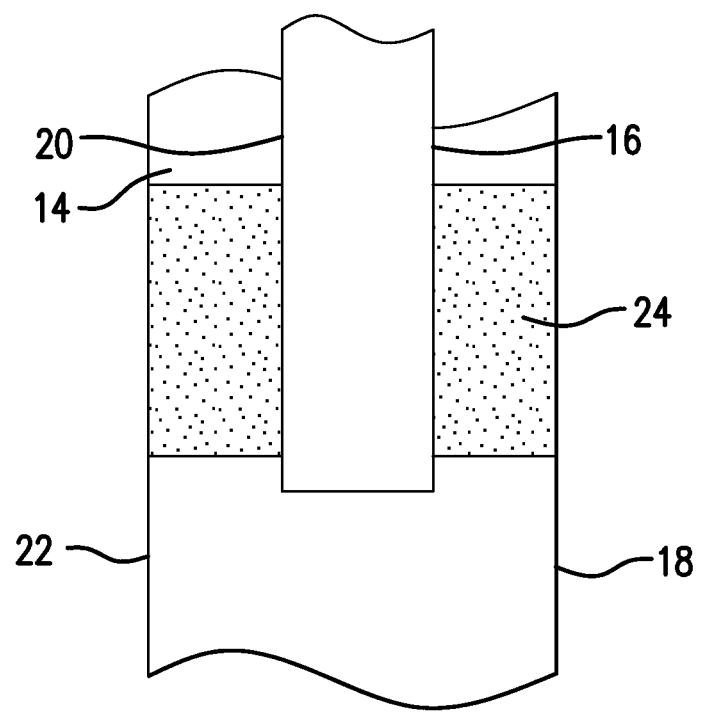
FIG. 3 depicts a cross sectional view of an exemplary embodiment of a seal formed around the downhole tubular.

The unoxidized state of the oxidizable material has smaller dimensions than an oxidized state. When the liquid cement 12 contacts the oxidizable material in the reactive material 10, the oxidizable material reacts with the high pH value of the cement and begins to quickly oxidize taking up a larger volume and releases Hydrogen, opening permeability of the cement 12 such that the cement 12 forms a cement seal 24 that fills the annulus 14 and seals the annulus 14 as shown in FIG. 3.

In another exemplary embodiment, the reactive material 10 includes one or both of an oil swellable packer and a water swellable packer in combination with the oxidizable material. The oxidizable material need not be chemically bound to polymers of the swellable packers. The swellable packer can be used to complement the oxidizable material as the primary cement packer. The oil swellable packer may include an oil reactive elastomer such as oleophillic hydrocarbon elastomer. The type of rubber used in the oil-swellable packer is composed of oleophillic hydrocarbon chains. The molecular structure of the polymer chain is characterized by weak attractive forces acting between the neighboring chains, fragments of the same chain, as well as by a relatively small number of the chemical crosslinks and chain entanglements. Oil is also a mixture of hydrocarbon molecules and each fragment of the oleophillic hydrocarbon polymer chain has a natural affinity to oil molecules. This affinity is described by the Hildebrand solubility parameter, which is a thermodynamic measure of the molecular attraction between similar materials. Molecules of oil diffuse inside the elastomer, surround the polymer chains, and thus replace or interfere with the attractive interactions between the neighboring polymer chains or polymer fragments within the same chain with the interactions of oil molecules. The polymer chains become decoupled from each other and begin to stretch. This process allows for more oil molecules to penetrate the elastomer, and the packer swells ultimately reaching an equilibrium state where oil moves in and out of the rubber. The magnitude of this swelling process is determined, in part, by how close the solubility parameters of the oil and the polymer are. The process can be described as solubility driven diffusion.

An exemplary embodiment of a water swellable packer may include a super absorbent polymer in a carrier elastomer. Such a water swellable packer is composed of nitrile rubber containing super absorbent polymer domains. Polymer chains of super absorbent polymer contain a very large number of partially negatively charged oxygen atoms and partially positively charged hydrogen atoms. Electrostatic interactions between the positively and negatively charged atoms of the super absorbent polymer chains (hydrogen bonding) force the chains to assume the near spherical shape (the low volume shape). In nature, molecules of liquids and gases move from high concentration to low concentration regions. Therefore, the water molecules and ions from brine diffuse into the elastomer compound, since the water concentration in the elastomer is low. As water molecules, which are also composed of partially negatively charged oxygen atoms and partially positively charged hydrogen atoms, approach the super absorbing polymer, electrostatic interactions between the water molecules and the charged atoms of the polymer chains establish. Water molecules and metallic charged ions from brines surround the super absorbent polymer chains one by one and destroy the intra- and intermolecular hydrogen bonding network, which, again, hydrogen bonding is what keeps the super absorbent polymer in the compact un-swollen condition. With diffusion of water molecules into the polymer network, chains of the super absorbent polymer tend to stretch as a larger number of water molecules surround them and will ultimately gain an equilibrium state. This results in the increase in volume of the super absorbent polymer domains with the nitrile rubber, and therefore, the packer swells. This process can be described as a concentration gradient diffusion process.

When the oxidizable material is combined with an oil swellable material and/or a water swellable material, the reactive material 10 including this combination may be coated or otherwise secured to an exterior or interior of a tubular 16 as previously described with respect to FIG. 1. As the tubular 16 encounters water and/or oil, the respective water swellable material and/or oil swellable material begins to swell. When cement 12 is introduced into the annular space 14 to be filled, the oxidizable material will rapidly oxidize and corrode, opening up permeability of the cement 12, which allows the swellable materials to be more active. That is, the oxidizable material serves as a prop for opening flow paths that allow fluid to contact the swellable material, which in turn allows the swellable material to fill any leak paths in the cement 12.

The combination of the oxidizable material and the oil and water swellable materials improve the sealing of a cement seal 24 by reacting to surrounding fluids, such as oil and/or water, as well as cement 12. Also, the presence of the oxidizable material assists the swellable materials in filling any microchannels and voids that occur within the cement 12. If the cement seal 24 is subsequently damaged by thermal effects or pressure fluctuations, the oil and water swellable materials can react with water or oil to continue sealing any leak paths.

Figure 4:
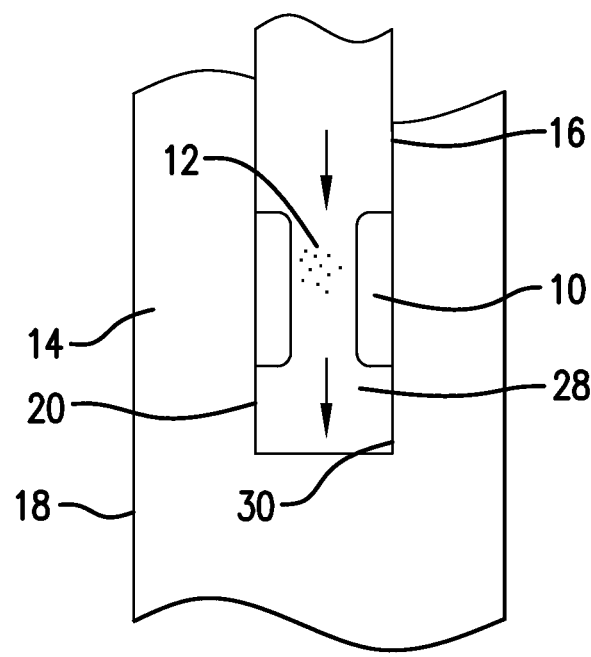
FIG. 4 depicts a cross sectional view of an exemplary embodiment of a downhole tubular carrying a reactive material therein; and, FIG. 5 depicts a cross sectional view of an exemplary embodiment of a seal formed within the downhole tubular.
Figure 5:
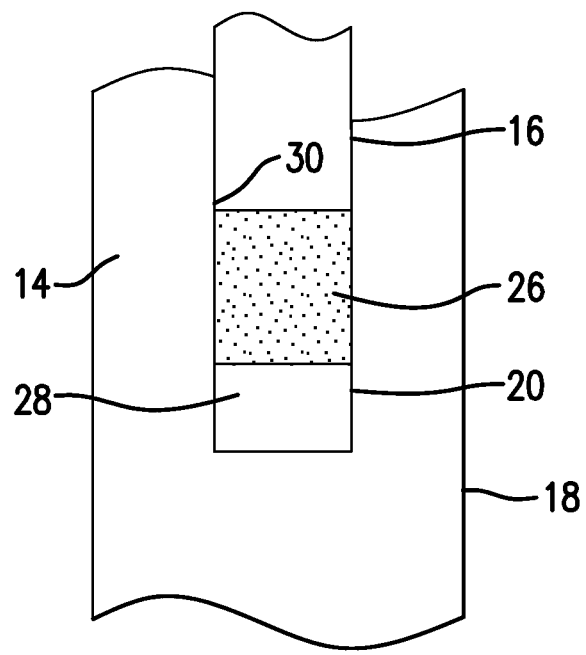

While the reactive material 10 has been specifically described as forming a cement seal 24 within an annulus 14, in another exemplary embodiment, the reactive material 10 may be provided on an interior surface 30 of a tubular 16 as shown in FIG. 4 to react with cement 12 to form a cement plug 26 within the interior 28 of the tubular 16 as shown in FIG. 5. As previously described, the reactive material 10 includes an oxidizable material, and may further include a water swellable material and/or an oil swellable material, inert carriers, degradable protective materials, accelerators or decelerators, etc. Some examples of degradable protective materials are but not limited to the following; Resins with hardeners such as fiberglass, polyurethanes, shrink wrappable films with varying melt or breakdown temperatures such as PVC, PVA, PET, and PTFE or similar.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed:

1. A downhole sealing system comprising:
   a reactive material provided on a tubular and including an oxidizable substance; and
   a sealing material, wherein the oxidizable substance is triggered to oxidize by contact with the sealing material, and the oxidizable substance reacts more quickly to pH of the sealing material than to pH of water.

2. The downhole sealing system of claim 1, wherein the oxidizable substance is a powdered metal.

3. The downhole sealing system of claim 1, wherein the oxidizable substance is Aluminum.

4. The downhole sealing system of claim 1 wherein the sealing material is cement.

5. The downhole sealing system of claim 4 wherein the reactive material provided on the tubular includes the oxidizable substance in an unoxidized state.

6. The downhole sealing system of claim 1 wherein the reactive material is provided on an exterior of a tubular to fill an annulus surrounding the tubular with the sealing material.

7. The downhole sealing system of claim 1 wherein the reactive material is provided on an interior of the tubular to plug the tubular with the sealing material.

8. The downhole sealing system of claim 1 wherein the reactive material further includes a substance to change an oxidation rate of the oxidizable material.

9. The downhole sealing system of claim 1 further comprising a degradable protective layer protecting the reactive material from premature oxidation.

10. The downhole sealing system of claim 1, wherein dimensions of the oxidizable material in an unoxidized state are smaller than dimensions of the oxidizable material in an oxidized state.

11. A downhole sealing system comprising:
    a reactive material provided on a tubular and including an oxidizable substance, the reactive material further including a swellable material swellable when in contact with at least one of oil and water; and,
    a sealing material, wherein the oxidizable substance is triggered to oxidize by contact with the sealing material, and, when the oxidizable substance oxidizes, permeability of the sealing material is opened increasing fluid access to the swellable material.

12. The downhole sealing system of claim 11, wherein the swellable material is an oleophillic hydrocarbon elastomer.

13. The downhole sealing system of claim 11, wherein the swellable material is a super absorbent polymer in a carrier elastomer.

14. A method of providing a seal in a downhole system, the method comprising:
    placing a tubular with a reactive material thereon in a borehole, the reactive material including an oxidizable material that reacts at a first rate to water; and
    passing a sealing material down the tubular, wherein the oxidizable material reacts at a second rate, faster than the first rate, to the sealing material.

15. The method of claim 14 wherein passing the sealing material includes injecting cement down the tubular.

16. The method of claim 14, wherein placing a tubular with a reactive material thereon includes placing a tubular with a reactive material on an exterior of the tubular in the borehole, and further comprising sealing an annulus surrounding the tubular with the sealing material.

17. The method of claim 14, wherein placing a tubular with a reactive material thereon includes placing a tubular with a reactive material on an interior of the tubular in the borehole, and further comprising plugging an interior of the tubular with the sealing material.

18. The method of claim 14, wherein the reactive material includes a swellable material within the reactive material, the swellable material swellable when contacted by water or oil.

19. The method of claim 18, wherein the oxidizable material oxidizes when contacted by the sealing material to increase contact of the swellable material with water or oil, and further comprising filling leak paths of the sealing material with the swellable material.

20. The method of claim 14, wherein the reactive material is coated with a degradable protective coating.

* * * * *